United States Patent  (10) Patent No.: US 11,405,234 B2
Wasilczyk et al.  (45) Date of Patent: Aug. 2, 2022

(54) EXTENSIBLE MAPPING FOR VEHICLE SYSTEM BUSES

(71) Applicant: Google LLC, Mountain View, CA (US)

(72) Inventors: Tomasz Pawel Wasilczyk, San Jose, CA (US); Yevgeniy Ruvinovich Karshenboym, Belmont, CA (US); Steve Paik, Renton, WA (US); Scott Randolph, Aptos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/764,153

(22) PCT Filed: Jun. 17, 2019

(86) PCT No.: PCT/US2019/037536
§ 371 (c)(1),
(2) Date: May 14, 2020

(87) PCT Pub. No.: WO2020/040848
PCT Pub. Date: Feb. 27, 2020

(65) Prior Publication Data
US 2020/0396101 A1    Dec. 17, 2020

Related U.S. Application Data

(60) Provisional application No. 62/720,701, filed on Aug. 21, 2018.

(51) Int. Cl.
*H04L 12/40* (2006.01)
*G07C 5/00* (2006.01)

(52) U.S. Cl.
CPC ........ *H04L 12/40013* (2013.01); *G07C 5/008* (2013.01); *H04L 2012/40215* (2013.01); *H04L 2012/40273* (2013.01)

(58) Field of Classification Search
CPC ..... H04L 12/40013; H04L 2012/40215; H04L 2012/40273; G07C 5/008
See application file for complete search history.

(56) References Cited

U.S. PATENT DOCUMENTS

2014/0280580 A1* 9/2014 Langlois ................ B60K 37/06
                                                               709/204
2015/0191175 A1* 7/2015 Zhang ................... B60W 40/10
                                                               701/36

(Continued)

FOREIGN PATENT DOCUMENTS

CN    104571069 A    4/2015
CN    107465695 A   12/2017

(Continued)

OTHER PUBLICATIONS

International Search Report and Written Opinion from counterpart PCT Application No. PCT/US2019/037536 dated Sep. 18, 2019, 14 pgs.

(Continued)

*Primary Examiner* — Henry Tsai
*Assistant Examiner* — Harry Z Wang
(74) *Attorney, Agent, or Firm* — Shumaker & Sieffert, P.A.

(57) ABSTRACT

In general, techniques are described for extensible mappings for vehicle system busses. A device configured to interact with a vehicle may perform the techniques. The device may comprise a memory that stores an extensible mapping between a local control message and a standard control message. The device may also include a processor configured to execute an operating system to control a system of the vehicle. The operating system may generate the standard control message, where the standard control message includes a first representation of a command set. The processor may translate, based on the extensible mapping, the (Continued)

standard control message to obtain the local control message, the local control message including a second representation of the command set. The processor may transmit, via a control bus coupled to the processor and the system, the local control message to initiate an operational state change of the system.

18 Claims, 7 Drawing Sheets

(56) References Cited

U.S. PATENT DOCUMENTS

| | | | |
|---|---|---|---|
| 2015/0234382 A1* | 8/2015 | Ju | G01S 7/003 |
| | | | 701/23 |
| 2017/0072876 A1 | 3/2017 | Rajan et al. | |
| 2017/0126703 A1* | 5/2017 | Ujiie | H04L 63/20 |
| 2017/0344005 A1* | 11/2017 | Zhu | H04L 67/12 |
| 2019/0045374 A1* | 2/2019 | Loomba | H04W 16/18 |
| 2019/0268444 A1* | 8/2019 | Mardmoeller | H04L 45/741 |

FOREIGN PATENT DOCUMENTS

| | | |
|---|---|---|
| JP | 2000257501 A | 9/2000 |
| JP | 2000310152 A | 11/2000 |
| JP | 2000310153 A | 11/2000 |
| JP | 2005236560 A | 9/2005 |
| JP | 2011109452 A | 6/2011 |
| JP | 2014162286 A | 9/2014 |
| WO | 2017140367 A | 8/2017 |

OTHER PUBLICATIONS

DBC Format—Embedded Systems Learning Academy, May 21, 2019, 8 pgs.

Documentation for HIDL interfaces—Android Open Source Project, Retrieved from https://source.android.com/reference/hidl/android/hardware/automotive/vehicle/2.0/IVehicle on May 9, 2019, 2 pgs.

Response to communication under rules 161(1) and 162 EPC dated dated Jun. 4, 2020, from counterpart European Application No. 19735073.9, filed Nov. 13, 2020, 13 pp.

International Preliminary Report on Patentability from counterpart application PCT/US2019/037536 dated Mar. 4, 2021, 9 pgs.

Examination Report from counterpart Indian Application No. 202047022926, dated Jul. 1, 2021, 7 pp.

Communication pursuant to Article 94(3) EPC from counterpart European Application No. 19735073.9 dated Nov. 26, 2021, 5 pp.

First Office Action and Search Report, and translation thereof, from counterpart Japan Application No. 2020-529523 dated Nov. 16, 2021, 16 pp.

Office Action, and translation thereof, from counterpart Korean Application No. 10-2020-7017170 dated Nov. 2, 2021, 13 pp.

Response to Office Action dated Jul. 1, 2021, from counterpart Indian Application No. 202047022926 filed Oct. 1, 2021, 76 pp.

Smith, "The Car Hacker's Handbook: A Guide for the Penetration Tester", O'Reilly Japan, Inc., Dec. 25, 2017, First Edition, ISBN: 978-4-87311-823-9, pp. 052-055.

Notice of Intent to Grant from counterpart Japan Application No. 2020-529523 dated Mar. 31, 2022, 6 pp.

Response to Communication pursuant to Article 94(3) EPC dated Nov. 26, 2021, from counterpart European Application No. 19735073.9 filed Mar. 24, 2022, 14 pp.

Decision of Rejection from counterpart Korean Application No. 10-2020-7017170 dated May 4, 2022, 10 pp.

* cited by examiner

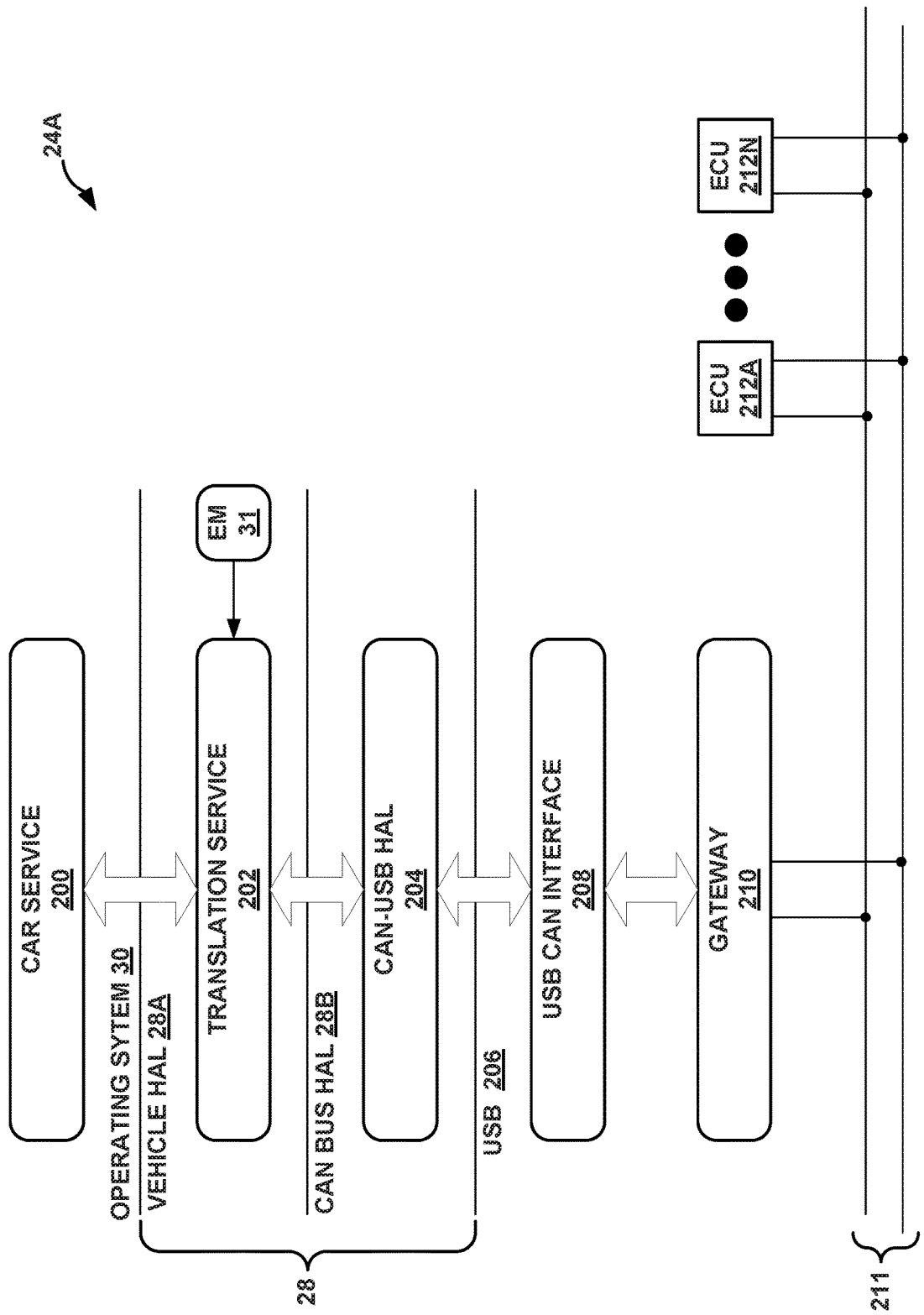

EXTENSIBLE MAPPING FOR VEHICLE SYSTEM BUSES

This application claims the benefit of U.S. Provisional Patent Application No. 62/720,701, the entire contents of which are hereby incorporated by reference as if set forth in its entirety.

BACKGROUND

A vehicle may include a so-called "head unit" or other integrated computing device that presents an interface (such as a graphical user interface—GUI) by which to control the vehicle systems, such as a heating, ventilation, and air conditioning (HVAC) system, a lighting system (for controlling interior and/or exterior lights), an entertainment system, a seating system (for controlling a position of a driver and/or passenger seat), etc. The head unit may issue one or more commands (which may be referred to as a "command set") to the vehicle systems to change an operational state of one or more of the vehicle systems. Given the wide variety of vehicle systems (in terms of both functionality and operation) between not only different models from the same manufacture, but also between models of different manufacturers, the head unit may be configured to output command sets that generally control the highest percentage of vehicle systems, as manual configuration of command sets is time consuming and expensive.

Furthermore, the manufacturers may statically code (or, in other words, "hard code") the command sets for performing each operational state change. That is, the manufacturers may statically code the command sets to conform to particular control bus protocols (some of which may be proprietary) by which the vehicle head unit may communicate with the one or more systems. The manufacturer may hard code an operating system executed by the vehicle head unit to generate command sets conforming to the control bus protocol. Each of the command sets may vary by the control bus and/or vendor of the one or more systems, etc., resulting in time consuming static coding of command sets for particular configurations of vehicles, which may even vary between vehicle model trims.

SUMMARY

In general techniques of this disclosure are directed to enabling a vehicle computing device (such as a vehicle head unit) to apply an extensible mapping for vehicle system busses. That is, vehicle system busses may conform to different proprietary and open standards by which command sets are communicated between the vehicle head unit and one or more systems of the vehicle. The vehicle head unit may execute an operating system that supports a uniform command set (or, in other words, a standard command set), while the vehicle system busses may communicate local control messages specified in accordance with a particular control bus protocol of a plurality of control bus protocols. Rather than hard code the operating system to support the particular local control messages, various aspects of the techniques may enable the vehicle head unit to obtain an extensible mapping between the standard command set and the local command set that conforms to the particular control bus protocol supported by the control bus.

As such, various aspects of the techniques may enable manufacturers to define an extensible mapping, which may be updated over time to accommodate updates to one or more of the operating system, the control bus, and/or the vehicle systems. The extensible mapping may define translations between the standard command set and the local command set, which the vehicle head unit may apply to automatically translate between the standard command set and the local command set. As only the extensible mapping may be defined, rather than hard coding such mappings statically within the operating system to support only the local command set, various aspects of the techniques may improve the speed with which vehicle head unit operating systems may be developed, improve interoperability with new or changing control bus protocols, and otherwise improve development of vehicle head unit operating systems while accommodating rapid deployment of such operating system that provide full featured support in terms of local command sets.

Furthermore, various aspects of the techniques may enable a vehicle head unit to adapt command sets for controlling vehicle systems. The vehicle head unit may be configured to implement a hardware abstraction layer (HAL) that determines associations between the command sets and operational state changes of the vehicle systems. Based on these associations, the HAL may adapt the command sets in an attempt to expose additional functionality (as represented by one or more operational states) of the vehicle systems. As such, the techniques may enable the HAL to automatically determine command sets specific to a particular model and manufacturer without resorting to manual configuration of the command sets.

In this respect, various aspects of the techniques may promote more efficient operation of the vehicle head units themselves. That is, the HAL may determine the associations between the command sets and the operational state changes, and adapt, based on the associations, the command sets in a manner that more efficiently causes the vehicle systems to undergo the operational state change. Rather than issue command sets that are generic to a vehicle system chosen by a large number of models and manufactures, but that may be inefficient (although functional) for some vehicle systems, the techniques may allow the HAL to adaptively generate command sets that efficiently cause the vehicle system to perform the operational state change, thereby saving processor cycles, conserving memory bandwidth and underlying memory resources consumed therewith, and promoting, as a result, more efficient power consumption.

In one example, various aspects of the techniques are directed to a method comprising: executing, by one or more processors of a vehicle, an operating system to control one or more systems of the vehicle; obtaining, by the one or more processors, an extensible mapping between a local control message specified in accordance with a control bus protocol and a standard control message supported by the operating system; generate, by the operating system executed by the one or more processors, the standard control message, the standard control message including a first representation of a command set to initiate an operational state change of the one or more systems; translating, by the one or more processors and based on the extensible mapping, the standard control message to obtain the local control message, the local control message including a second representation of the command set; and transmitting, by the one or more processors and via a control bus coupled to the one or more processors and the one or more systems, the local control message to initiate the operational state change of the one or more systems.

In another example, various aspects of the techniques are directed to a device configured to interact with a vehicle, the device comprising: a memory configured to store an extensible mapping between a local control message specified in accordance with a control bus protocol and a standard control message supported by an operating system; and one or more processors configured to: execute the operating system to control one or more systems of the vehicle, the operating system configured to generate the standard control message, the standard control message including a first representation of a command set to initiate an operational state change of the one or more systems; translate, based on the extensible mapping, the standard control message to obtain the local control message, the local control message including a second representation of the command set; and transmit, via a control bus coupled to the one or more processors and the one or more systems, the local control message to initiate the operational state change of the one or more systems.

In another example, various aspects of the techniques are directed to a non-transitory computer-readable storage medium having stored thereon instructions that, when executed, cause one or more processors of a vehicle head unit to: execute an operating system to control one or more systems of the vehicle; obtain an extensible mapping between a local control message specified in accordance with a control bus protocol and a standard control message supported by the operating system, the operating system configured to generate the standard control message, the standard control message including a first representation of a command set to initiate an operational state change of the one or more systems; translate, based on the extensible mapping, the standard control message to obtain the local control message, the local control message including a second representation of the command set; and transmit, by the one or more processors and via a control bus coupled to the one or more processors and the one or more systems, the local control message to initiate the operational state change of the one or more systems.

In another example, various aspects of the techniques are directed to a method of interfacing with a first vehicle, the method comprising: issuing, by a processor and to one or more systems of the first vehicle, a command set to initiate an operational state change of the one or more systems; responsive to issuing the command set and after the operational state change, obtaining, by the processor, from the one or more systems, respective indications of an operational state of each of one or more vehicle parameters; determining, by the processor and for the command set, one or more dependencies between the operational states of the one or more vehicle parameters; and adapting, by the processor and based on the one or more dependencies, the command set to accommodate variability between the one or more systems of the first vehicle and one or more systems of a second vehicle.

In another example, various aspects of the techniques are directed to a device configured to interface with a first vehicle, the head unit comprising: one or more memories configured to store a command set to initiate an operational state change of one or more systems of the first vehicle; and one or more processors configured to: issue, to the one or more systems of the first vehicle, the command set; obtain, from the one or more systems and responsive to issuing the command set and after the operational state change, respective indications of an operational state of each of one or more vehicle parameters; determine, for the command set, one or more dependencies between the operational states of the one or more vehicle parameters; and adapt, based on the one or more dependencies, the command set to accommodate variability between the one or more systems of the first vehicle and one or more systems of a second vehicle.

In another example, various aspects of the techniques are directed to a computer-readable medium having stored thereon instructions that, when executed, cause one or more processors to: issue, to one or more systems of the a vehicle, a command set to initiate an operational state change of the one or more systems; obtain, responsive to issuing the command set and after the operational state change, from the one or more systems, respective indications of an operational state of each of one or more vehicle parameters; determine, for the command set, one or more dependencies between the operational states of the one or more vehicle parameters; and adapt, based on the one or more dependencies, the command set to accommodate variability between the one or more systems of the first vehicle and one or more systems of a second vehicle.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 2A and 2B are block diagrams illustrating examples of the head unit of FIG. 1 in more detail.

DETAILED DESCRIPTION

Figure 1:
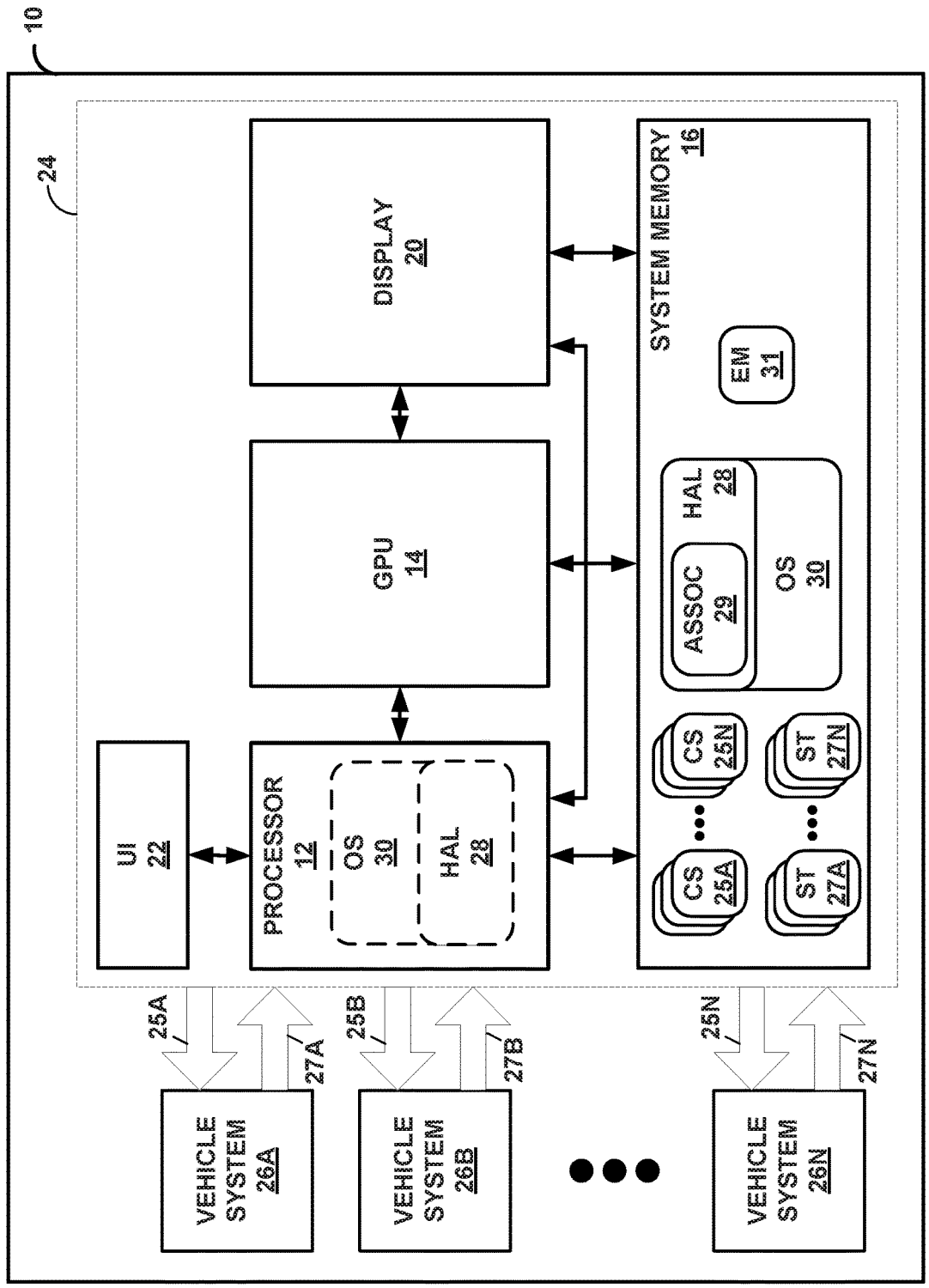
FIG. 1 is a block diagram illustrating an example vehicle configured to perform various aspects of the techniques described in this disclosure.

FIG. 1 is a block diagram illustrating an example vehicle 10 configured to perform various aspects of the techniques described in this disclosure. In the example of FIG. 1, vehicle 10 is assumed in the description below to be an automobile. However, the techniques described in this disclosure may apply to any type of vehicle capable of conveying one or more occupants between locations, such as a motorcycle, a bus, a recreational vehicle (RV), a semi-trailer truck, a tractor or other type of farm equipment, a train, a plane, a drone, a helicopter, a personal transport vehicle, and the like.

In the example of FIG. 1, vehicle 10 includes a processor 12, a graphics processing unit (GPU) 14, and system memory 16. In some examples, processor 12, GPU 14, and a transceiver module (not shown in FIG. 1) may be formed as an integrated circuit (IC). For example, the IC may be considered as a processing chip within a chip package, and may be a system-on-chip (SoC).

Examples of processor 12, and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may represent a central processing unit (CPU) of vehicle 10. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks). Although shown as a dedicated GPU 14, GPU 14 may represent an integrated GPU that is integrated into the underlying circuit board (such as a so-called "motherboard"), or otherwise incorporated into processor 12.

Processor 12 may execute various types of applications. Examples of the applications include web browsers, e-mail applications, spreadsheets, video games, or other applications that generate viewable objects for display. System memory 16 may store instructions for execution of the one or more applications. The execution of an application by processor 12 causes processor 12 to produce graphics data for image content that is to be displayed. Processor 12 may transmit graphics data of the image content to GPU 14 for further processing based on instructions or commands that processor 12 transmits to GPU 14.

Processor 12 may communicate with GPU 14 in accordance with an application programming interface (API). Moreover, the techniques described in this disclosure are not required to function in accordance with an API, and processor 12 and GPU 14 may utilize any technique for communicating with GPU 14.

System memory 16 may represent a memory for vehicle 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 to perform the functions ascribed in this disclosure to processor 12. Accordingly, system memory 16 may be a non-transitory computer-readable storage medium having instructions stored thereon that, when executed, cause one or more processors (e.g., processor 12) to perform various functions.

System memory 16 is a non-transitory storage medium. The term "non-transitory" indicates that the storage medium is not embodied in a carrier wave or a propagated signal. However, the term "non-transitory" should not be interpreted to mean that system memory 16 is non-movable or that its contents are static. As one example, system memory 16 may be removed from vehicle 10, and moved to another device. As another example, memory, substantially similar to system memory 16, may be inserted into autonomous vehicle 10. In certain examples, a non-transitory storage medium may store data that can, over time, change (e.g., in RAM).

As further shown in the example of FIG. 1, vehicle 10 may include a display 20 and a user interface 22. Display 20 may represent any type of passive reflective screen on which images can be projected, or an active reflective or emissive or transmissive display capable of displaying images (such as a light emitting diode (LED) display, an organic LED (OLED) display, liquid crystal display (LCD), or any other type of active display). Although shown as including a single display 20, vehicle 10 may include a number of displays that may be positioned throughout a cabin of vehicle 10. In some examples, passive versions of display 20 or certain types of active versions of display 20 (e.g., OLED displays) may be integrated into seats, tables, roof liners, flooring, windows (or in vehicles with no windows or few windows, walls) or other aspects of the cabin of vehicles. When display 20 represents a passive display, display 20 may also include a projector or other image projection device capable of projecting or otherwise recreating an image on passive display 20. Furthermore, display 20 may include displays integrated into driver-side dashboards that virtually represent physical instrument clusters (showing speed, revolutions, engine temperature, etc.).

Display 20 may also represent displays in wired or wireless communication with autonomous vehicle 10. Display 20 may, for example, represent a computing device, such as a laptop computer, a heads-up display, a head-mounted display, an augmented reality computing device or display (such as "smart glasses"), a virtual reality computing device or display, a mobile phone (including a so-called "smart phone"), a tablet computer, a gaming system, or another type of computing device capable of acting as an extension of or in place of a display integrated into vehicle 10.

User interface 22 may represent any type of physical or virtual interface with which a user may interface to control various functionalities of vehicle 10. User interface 22 may include physical buttons, knobs, sliders or other physical control implements. User interface 22 may also include a virtual interface whereby an occupant of vehicle 10 interacts with virtual buttons, knobs, sliders or other virtual interface elements via, as one example, a touch-sensitive screen, or via a touchless interface. The occupant may interface with user interface 22 to control one or more of a climate within vehicle 10, audio playback by vehicle 10, video playback by vehicle 10, transmissions (such as cellphone calls) through vehicle 10, or any other operation capable of being performed by vehicle 10.

User interface 22 may also represent interfaces extended to display 20 when acting as an extension of or in place of a display integrated into vehicle 10. That is, user interface 22 may include virtual interfaces presented via a heads-up display (HUD), augmented reality computing device, virtual reality computing device or display, tablet computer, or any other of the different types of extended displays listed above.

In the context of vehicle 10, user interface 22 may further represent physical elements used for manually or semi-manually controlling vehicle 10. For example, user interface 22 may include one or more steering wheels for controlling a direction of travel of vehicle 10, one or more pedals for controlling a rate of travel of vehicle 10, one or more hand brakes, etc.

In the example of FIG. 1, processor 12, GPU 14, system memory 16, display 20, and UI 22 may collectively represent, at least in part, what is referred to as a head unit 24 (or, in other words, a "vehicle head unit 24") in the automotive context. Head unit 24 may represent any integrated or separate computing device capable of interfacing with various aspects of vehicle 10 and/or providing entertainment for occupants and/or information regarding vehicle 10 (where such head units may be referred to as "infotainment units" or "infotainment systems").

As further shown in the example of FIG. 1, vehicle 10 may include a number of different vehicle systems 26A-26N ("vehicle systems 26"). Vehicle systems 26 may include a heating, ventilation, air conditioning (HVAC) system, a temperature regulation system (e.g., which may include heated and/or cooled seats in addition to the HVAC system), a lighting system (for providing interior and/or exterior lighting), a seat control system (for adjusting a position of occupant seating), a mirror control system (for controlling interior and/or exterior mirrors, including rearview mirrors, side mirrors, visor mirrors, etc.), a windshield wiper control system, an entertainment system (for controlling radio playback, video playback, image display, etc.), a safety assistant system (for controlling parking assistance, back-up assistance, etc.), a sun-/moon-roof control system (for controlling sunroofs and/or moonroofs), and any other type of vehicle system capable of control via a head unit, such as head unit 24. An example of vehicle systems 26 may include an electronic control unit (ECU), which may control any of the foregoing examples of vehicle systems 26.

Head unit 24 may issue one or more commands (which may be referred to as a "command set," shown in FIG. 1 as "CS 25A-25N," and collectively referred to as "CS 25") to vehicle systems 26 to change an operational state of one or more of vehicle systems 26. Given the wide variety of vehicle systems 26 (in terms of both functionality and operation) between not only different models of vehicles from the same manufacture, but also between models of vehicles from different manufacturers, head unit 24 may be configured to output command sets 25 that generally control the highest percentage of vehicle systems 26, as manual configuration of command sets is time consuming, expensive, and prone to error.

Furthermore, head unit 24 may execute an operating system ("OS") 30 that is configured to output the command sets according to a control bus protocol, such as a control area network (CAN) protocol. Operating systems of head units, such as OS 30, may be statically configured (or, in other words, "hard coded") to communicate with vehicle systems 26 via the CAN protocol or other standard (e.g., an open or proprietary) control bus protocol. That is, the manufacturer may manually program the operating system to enable the operating system to interface with each of vehicle systems 26 via the control bus (which is not shown in the example of FIG. 1 for ease of illustration purposes).

Programming the operating systems to correctly interface with each of vehicle systems 26 may be time consuming and require significant testing to ensure correct interoperability with vehicle systems 26. To illustrate, a manufacturer may source vehicle systems 26 from a wide variety of vendors, which may provide vehicle systems 26 that communicate states of vehicle properties and are controlled in accordance with a number of different control bus protocols. The manufacturer may, even within a single model, have to source vehicle systems 26 that communicate according to different control bus protocols (such as between different trims of the same model). The manufacturer may, as a result, create two or more different versions of the operating system, each of which are individually hard coded to communicate with vehicle systems 26 via the different control bus protocols. In addition, any changes to the control bus protocol may result in the manufacturer updating the operating system to hard code the operating system to support the newer versions of the control bus protocol, which may potentially reduce the ability of manufacturers to support new or changing control bus protocols, thereby potentially preventing vehicle 10 from receiving upgrades that improve safety, convenience and other aspects of vehicle 10.

In accordance with various aspects of the techniques described in this disclosure, a vehicle computing device (such as, as one example head unit 24) may apply an extensible mapping for vehicle system busses (which may be referred to as a "control bus"). As noted above, vehicle system busses may conform to different proprietary and open standards by which command sets ("CS") 25A-25N ("CS 25") are communicated between head unit 24 (which may also be referred to as a "vehicle head unit 24") and one or more systems of the vehicle (e.g., vehicle systems 26). Vehicle head unit 24 may execute an operating system 30 that supports a uniform command set (or, in other words, a standard command set), while vehicle system busses 26 may communicate local control messages specified in accordance with a particular local control bus protocol of a plurality of local control bus protocols. Rather than hard code operating system 30 to support the particular local control messages, various aspects of the techniques may enable vehicle head unit 24 to obtain an extensible mapping 31 ("EM 31") between the standard command set and the local command set that conforms to the particular local control bus protocol supported by the local control bus. The local control message may be formatted in accordance with one of a DBC format or a Kayak CAN definition (KCD) format.

In operation, processor 12 may execute OS 30 to control one or more of vehicle systems 26, where OS 30 may support a standard command set. OS 30 may output the standard command set as one or more messages in accordance with a common or standard control bus protocol, where these messages may be referred to as "standard control messages." Processors 12 may obtain EM 31 from system memory 16, which may define a mapping between a local control message specified in accordance with a local control bus protocol and the standard control message supported by OS 30.

In some examples, processor 12 may execute a hardware abstraction layer (HAL) 28, providing what may be referred to as a software shim layer between OS 30 and vehicle systems 26 (including the control bus, which is not shown in the example of FIG. 1). In other words, HAL 28 may represent a unit configured to extend an underlying head unit operating system 30 ("OS 30"). Processor 12 may execute one or more threads representative of OS 30, including one or more threads associated with HAL 28. Processor 12 may retrieve OS 30 (including HAL 28) from system memory 16 in the form of one or more commands associated with the one or more threads of OS 30, loading the commands into local memory (e.g., a layer one (L1), a layer two (L2), and/or a layer three (L3) cache, which are not shown in the example of FIG. 1 for ease of illustration purposes) prior to execution. As such, HAL 28 and OS 30 are shown as being included within processor 12 using dashed lines to indicate execution by processor 12, while shown as also being included in system memory 16 using solid lines to denote long term storage of HAL 28 and OS 30. Although shown as being executed by processor 12, HAL 28 may also be implemented using dedicated circuitry or hardware logic.

In any event, HAL 28 may obtain EM 31 when providing the software shim layer to enable OS 30 to interface with vehicle systems 26. As such, OS 30 may generate command sets 25 as standard control messages that conform to a control bus protocol supported by OS 30. HAL 28 may receive (or, in some instances, intercept) the standard control messages and translate, based on EM 31 and without OS 30 requesting such translation (and in this respect transparently form the perspective of OS 30), the standard control messages to obtain the local control message that conforms to the local control bus.

EM 31 may define a byte-wise mapping between the standard control message and the local control message. That is, EM 31 may define a mapping for each byte of the standard control message, defining how each byte is to be rearranged within the message and/or the value is to be converted (e.g., for control message identifiers) to conform to the local control bus protocol. HAL 28 may receive the standard control message, which may include a first representation of a command set, such as one of command sets 25, to initiate an operational state change of one or more of vehicle systems 26.

HAL 28 may apply EM 31 to the standard control message to rearrange or otherwise convert values of bytes within the standard control message, thereby translating the standard control message to obtain the local control message the conforms with the control bus protocol. The local control message may, as such, include a second representation of the command set. HAL 28 may transmit, via the control bus coupled to processor 12 and vehicle systems 26, the local control message to initiate the operational state chance of one or more of vehicle systems 26.

HAL 28 may likewise receive (or in some instances transparently intercept from the perspective of OS 30 and vehicle systems 26) local control messages that include operational states 27A-27N ("operational states 27," which are shown in FIG. 1 as "ST 27A-27N") from vehicle systems 26. The local control messages may conform to the local control bus protocol. HAL 28 may translate, based on EM 31, the local control messages to obtain standard control messages, which again are supported by OS 30. HAL 28, as noted above, may provide this translation as part of abstracting the underlying hardware (or in other words, as part of providing the shim software layer), allowing for potentially simpler development and installation of OS 30 across a variety of different hardware platforms. HAL 28 may provide the standard control messages to OS 30, which may obtain confirmation of operational state changes requested by previously sent standard control messages.

In addition, head unit 24 may adapt command sets 25 for controlling vehicle systems 26. As noted above, head unit 24 may be configured to implement HAL 28 that determines associations 29 ("ASSOC 29") between command sets 25 and operational states 27 changes of vehicle systems 26. Based on these associations 29, HAL 28 may adapt command sets 25 in an attempt to expose additional functionality (as represented by one or more operational states 27) of vehicle systems 26. As such, the techniques may allow HAL 28 to automatically determine command sets 25 specific to a particular model and manufacturer, thereby potentially avoiding manual configuration of command sets 25 and the accompanying time, expense, and potential for error. HAL 28 may use associations 29 as a basis for EM 31, defining various mappings between the standard control message and the local control messages for achieving various operational state changes of vehicle systems 26.

As noted above, HAL 28 may represent a unit configured to process outputs from OS 30 responsive, in one example, to input received via a GUI presented by display 20 from an occupant to change an operational state of one or more of vehicle systems 26. HAL 28 may also process outputs from OS 30 that are automatically generated in response to other inputs, such as operational states 27. The outputs may refer to command sets 25 issued by OS 30 to perform the operational state change. OS 30 may issue command sets 25 as a series of "SET" commands, each of which specify one of vehicle systems 26, a property of the one of vehicle systems 26, and a value for the specified property. The SET commands may specify the operational state to which the specified one of vehicle systems 26 is to maintain.

HAL 28 may also process inputs from vehicle systems 26 indicative of current operational states 27 of various properties of vehicle systems 26. OS 30 may output "GET" commands that query vehicle systems 26 regarding the various properties to which vehicle systems 26 respond by providing the inputs indicative of current operational states 27. Similar to the "SET" commands, the "GET" commands may each specify one of vehicle systems 26 and a property of the one of vehicle systems 26 to which the query for a value is directed. In some examples, vehicle systems 26 may respond with inputs after performing various operational state changes responsive to "SET" commands. Regardless, HAL 28 may process the outputs and the inputs to determine associations 29.

To illustrate, assume that vehicle system 26A represents an HVAC system. Various HVAC systems may operate differently depending on an ignition state of the vehicle and underlying environmental control unit (ECU) of the HVAC system. Furthermore, consider that various properties of HVAC system 26A may interact with other properties of HVAC systems 26A and potentially other ones of vehicle systems 26B-26N. For example, when setting the HVAC temperature, HVAC system 26A may automatically change a speed of a fan. HAL 28 may determine associations 29 between various vehicle properties of HVAC system 26A represented by operation states 27A that result from outputting command sets 25A to vehicle systems 26 in order to set the HVAC temperature.

HAL 28 may next adapt, based on associations 29, command sets 25. In the above example, HAL 28 may adapt, based on associations 29 identifying the dependency between setting the HVAC temperature and automatically changing the fan speed, command set 25A to include an additional command setting the fan speed of HVAC system 26A to its previously set fan speed value (which may be configured based on occupant preference or as a result of the occupant previously setting the fan speed of HVAC system 26A). HAL 28 may, in this way, adapt, based on the association 29 (which may also be referred to as "dependencies 29"), command sets 25 to accommodate variability between vehicle systems 26 of vehicle 10 and vehicle systems of a second vehicle.

Further examples of dependencies between parameters outside of the HVAC context may include interior lighting (dome lights, reading lights, floor lights, etc.), which may be directly controllable (via a switch or other user interface, including via the head unit) as well as associated with door or ignition states. HAL 28 may identify dependencies between a state of the doors and that a light turns on when the driver door is opened, which may enable HAL 28 to determine that the light is useful for illuminating the driver's area.

Another example may be in the context of the wipers and washers, where HAL 28 may determine that the wipers are set to a particular wiper rate when the washers are enabled, which may override an existing wiper rate. Yet another example may be in the context of advanced driver assistance systems (ADAS), where HAL 28 may identify that various states of the ADAS are only available when vehicle 10 is travelling at certain speeds, or when vehicle 10 is in certain states (e.g., when operating in reverse, the ADAS activates the rear camera and displays via the head unit the image captured by the rear camera). HAL 28 may determine the parameters and then identify all of the various dependencies relative to lighting, wipers and washers, ADAS, vehicle states and/or speeds.

Moreover, HAL 28 may determine a list of parameters that are available when vehicle 10 is turned on. HAL 28 may, as one example, determine whether vehicle 10 allows you to activate the headlights when the ignition is off, as some vehicles may automatically turn off the headlights when the vehicle is powered off. Hal 28 may determine dependencies between various parameters relative to various ignition states (e.g., off, accessories, on, etc.). Hal 28 may also determine dependencies between seat position relative to various states of vehicle 10 (such as in gear and/or moving or parked and/or not moving).

In this respect, HAL 28 may process changes between operational states 27 to generate a record of the changes, parse operational states 27 to find causality between properties (which may also be referred to as "parameters"—e.g., when parameter A changes, parameters B and C also change), and generate associations 29 that identify the causalities (or, in other words, dependencies) between changes in operational state 27. In some example, HAL 28 may store associations 29 as a table, a linked list, a graph, a tree, or any other suitable data structure. In other examples, HAL 28 may train a model using machine learning to identify associations 29 and dynamically generate different versions of command sets 25 that address associations 29. As such, HAL 28 may, to determine dependencies 29, perform machine learning with respect to the operational state change initiated by command sets 25 and operational states 27 of the vehicle parameters.

HAL 28 may, upon identifying these dependencies 29, define mappings 31 between the standard control message supported by OS 30 for the particular operational state changes identified by dependencies 29 and the local control message that conform to the local control bus protocol used to invoke the operational state changes. The mappings may enable the above noted translation, where such mappings are extensible in that EM 31 may change over time due to updates to one or more of OS 30, the control bus, and/or vehicle systems 26. In some examples, rather than HAL 28 defining EM 31, manufacturers may manually program EM 31, defining a file or script capable of being executed by HAL 28 to perform the translation between the standard control message and the local control message.

As such, various aspects of the techniques may enable manufacturers to define EM 31, which may be updated over time to accommodate updates to one or more of OS 31, the control bus, and/or vehicle systems 26. EM 31 may define translations between the standard command set and the local command set, which the vehicle head unit may apply to automatically translate between the standard command set and the local command set. As only EM 31 may need to be defined, rather than hard coding such mappings statically within the operating system to support only the local command set, various aspects of the techniques may improve the speed with which vehicle head unit operating systems (e.g., OS 30) may be developed, improve interoperability with new or changing control bus protocols, and otherwise improve development of vehicle head unit operating systems while accommodating rapid deployment of such operating system that provide full featured support in terms of local command sets.

Moreover, various aspects of the techniques may promote more efficient operation of head unit 24 itself. That is, HAL 28 may determine associations 29 between command sets 25 and changes of operational state 27, and adapt, based on associations 29, command sets 29, in a manner that more efficiently causes vehicle systems 26 to undergo changes in operational states 27. Rather than issue command sets 25 that are generic to vehicle systems 26 chosen by a large number of models and manufactures, but that may be inefficient (although functional) for some vehicle systems 26, the techniques may allow HAL 28 to adaptively generate command sets 25 that more efficiently (relative to the generic command sets) cause vehicle systems 26 to perform the change of operational states 27 change, thereby saving processor cycles, conserving memory bandwidth and underlying memory resources consumed therewith, and promoting, as a result, more efficient power consumption.

Although described with respect to HVAC systems, the techniques may be applied with respect to other systems. Some possible examples include interior lighting systems (e.g., dome lights, reading lights, etc.) which head unit 24 may directly control as well as associated with door open or ignition states. Head unit 24 may determine that a light turns on when the driver door is open, and thereby determine that the light is useful for illuminating the driver's area. As another example, head unit 24 may identify associations between wipers and washers for the windows. Head unit 24 may identify associations between certain vehicle state and/or speeds and the advanced driver assistance systems (ADAS) modes (where certain ADAS modes may only be available in certain car states and/or speeds).

Figure 2B:
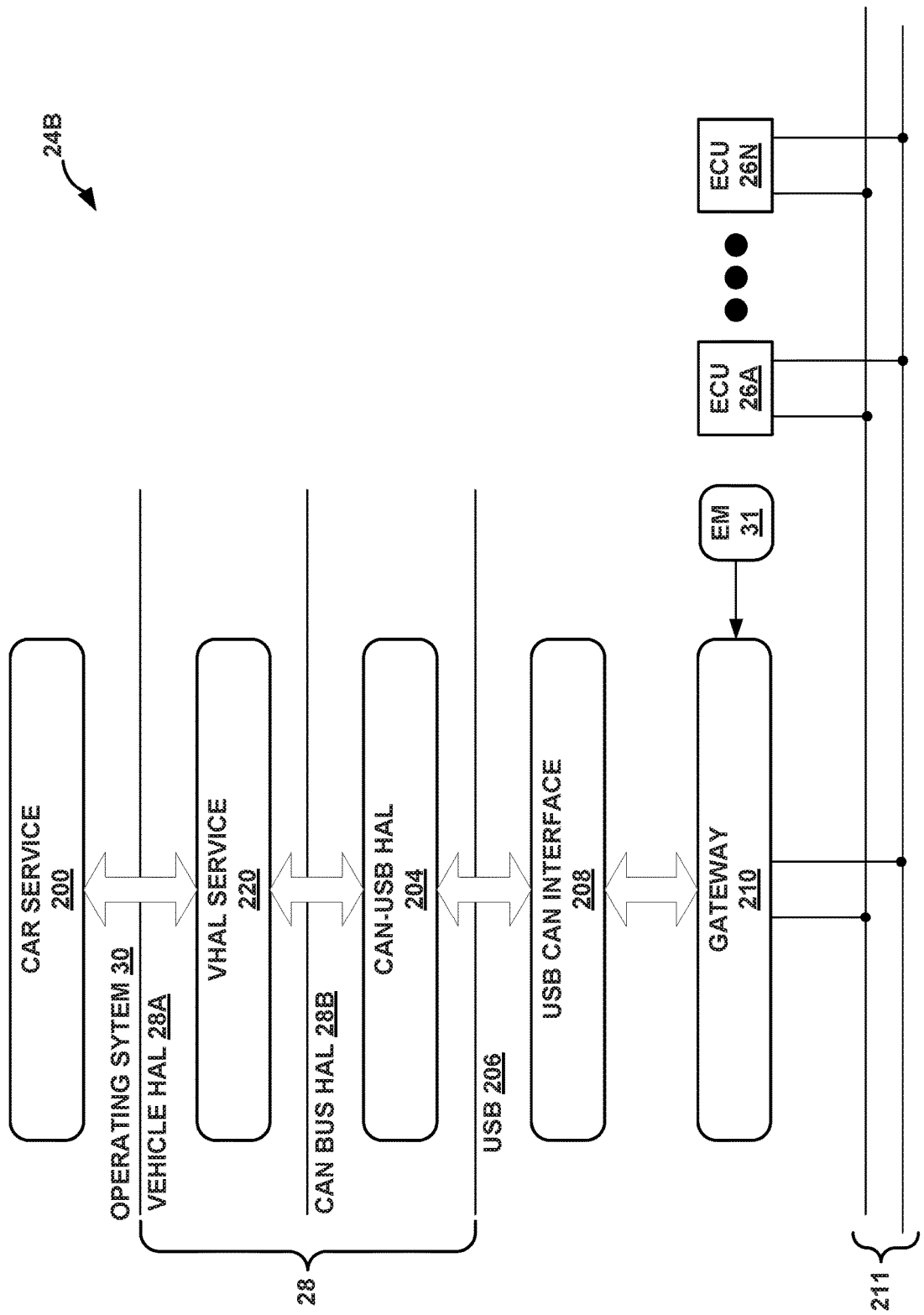

FIGS. 2A and 2B are block diagrams illustrating examples of the head unit of FIG. 1 in more detail. Head unit 24A shown in the example of FIG. 2A is one example of head unit 24 shown in FIG. 1. Head unit 24A may execute OS 30, which provides an execution environment for a car service 200.

Head unit 24A may also execute two different HALs 28A and 28B. Vehicle HAL 28A may execute a translation service 202, which may perform translations, based on EM 31, between the standard control message and the local control messages in accordance with various aspects of the techniques described in this disclosure. Controller area network (CAN) bus HAL 28B may represent a unit configured to convert the local control messages to universal system bus (USB) signals and USB signals to local control messages, providing yet another layer of abstraction between the hardware and OS 30.

Head unit 24A may also include a USB 206, which is a physical USB interface along with one or more processors, fixed-logic circuitry, dedicated signal processors, a dedicated control processor (such as a dedicated control bus processor) and/or the like that expose a USB CAN interface 208 and a gateway 210. USB CAN interface 208 may represent a unit configured to provide access to CAN 211 via a USB port. Gateway 210 represents a unit configured to expose a control bus gateway by which to control access to CAN 211, and may represent a firewall or other type of device capable of limiting access to CAN 211 when certain conditions are present (e.g., dropping a malformed CAN signal, etc.).

As noted above, translation service 202 may receive standard control messages from OS 30, which may have originated from car service 200 or elsewhere (such as one or more applications executed in the execution environment provided by OS 30). Translation service 202 may obtain EM 31, which may represent a file or other data structure capable of storing mappings. An example of EM 31 follows below.

```
vehicleProperty {
    vhalPropertyId: WINDOW_MOVE
    access: READ_WRITE
    canSignal {
        area: ROW_1_LEFT
        messageId: 0x124
        bit: 0
        size: 4
        conversionEnum { // no-op
            canValue: 0
        }
        conversionEnum {
            vhalValue: 2 // fast open
            canValue: 0xA
        }
        conversionEnum {
            vhalValue: -2 // fast close
            canValue: 0xB
        }
    }
    cansignal {
        area: ROW_1_RIGHT
        messageId: 0x124
        bit: 4
        size: 4
        conversionEnum {
            ...
        }
    }
}
```

In the above example, EM 31 begins with a standard command "vehicleProperty," signaling that the following relates to a vehicle property (which is another way to refer to an operational state). The next line specifies a vehicle HAL (VHAL) property identifier ("vhalPropertyId") as a window move ("WINDOW_MOVE"), which defines mappings for opening and closing power windows. WINDOW_MOVE may represent one example of a standard identifier and may not be vehicle specific The third line provides what access is allowed, specifying the access as read/write ("READ_WRITE") and denoting that the window move property is capable of being red (e.g., by a GET command) and written (e.g., by a SET command). Each operational state of the vehicle may be defined in this manner with a vehicle property identifier and an access level.

After each operational state opening statements identifying the vehicle property and access, EM 31 may define a mapping for each applicable area in the vehicle. The mapping begins with a CAN signal ("canSignal") followed by an opening curly bracket. Each CAN signal may specify a respective area, where the first mapping identifies an area as the first row on the left ("ROW_1_LEFT"), which refers to the front driver side window (in a left side drive situated vehicle). Next, the front driver side window mapping specifies a message identifier ("messageId"), which is the message identifier used for the corresponding CAN message (i.e., 0x124 in this example). Following the message is a bit (set to zero) and size (set to four), which are CAN specific syntax that need to be set when translating the standard control message to the local control message (which may, in this example, referred to as a CAN message).

Next are three "conversionEnum" statements, each of which are defined by an opening and closing curly bracket. "conversionEnum" signals that there is a conversion between the standard control message enumeration (for specifying a no-operation window move) and the CAN message (for specifying a no-operation window move). In this example, the conversion adds a CAN value of zero to the standard control message, which does not include a VHAL value ("vhalValue") for a no-operation window move. The next conversionEnum specifies a conversion of the vhalValue for a fast open (which is two) to the canValue for performing a fast open (which is 0xA). The third conversionEnum replaces the vhalValue for a fast close (which is negative two) to the canValue for performing the fast close (which is 0xB).

Following the third conversionEnum, EM 31 specifies an area of the front right passenger side window ("ROW_1_RIGHT"), having the same message identifier as the first CAN signal statement, but specifying four bits and a size of four. EM 31 may include a number of conversionEnum statements and possibly additional CAN signal statements for different areas of the car, which are not shown for ease of explanation purposes.

Translation service 202 may receive a standard control message that defines a fast open of the front right driver side window as a sequence of one or more bytes, defining an operational state change as WINDOW_MOVE, ROW_1_LEFT, and a vhalValue of 2. Translation service 202 may generate a CAN message by replacing the WINDOW_MOVE, ROW_1_LEFT with the message ID of 0x124, a bit and size as 0|4, and a CAN value of 0xA. Likewise, translation service 202 may convert a CAN message specifying the fast open of the driver right side window, replacing the message ID of 0x124, a bit and size as 0|4, and a CAN value of 0xA with WINDOW_MOVE, ROW_1_LEFT, and a vhalValue of 2.

Another example of EM 31 is provided below, which passes a temperature in Celsius.

```
vehicleProperty {
    vhalPropertyId: HVAC_TEMPERATURE_SET // standard ID
(VHAL)
    access: READ // this vehicle doesn't allow HU to set
                 // temperature
    canSignal {
        area: ROW_1_LEFT
        messageId: 0x123
        bit: 8 // value is located starting at 8th bit of
    the
               // payload
        size: 16 // value takes 2 bytes of the payload
        scale: 2
        offset: 50 // scale/offset is a common CAN technique
        conversion {
            method: FAHRENHEIT_TO_CELSIUS
        }
    }
}
```

In the above example, EM 31 specifies a vhalPropertyId of HVAC temperature set ("HVAC_TEMPERATURE_SET"), which is a standard ID used by OS 30. Access is specified in the third line, where EM 31 sets the access to read, as vehicle 10 in this instance does not allow head unit 24 to set the temperature (which may only be set by dedicated buttons or other controls). In the canSignal statement, EM 31 defines the area as front row driver side, and specifies a number of CAN specific syntax in the form of a message ID, bit, size, scale, and offset, each of which is a common CAN syntax. The "conversion" is defined whereby EM 31 specifies a method call to a function entitled "FAHRENHEIT_TO_CELSIUS."

Translation service 202 may receive a standard control message requesting the HVAC temperature and generate a CAN message that includes the message ID of 0x123, the bit and size as 8|16 (where the bit of eight indicates that the temperature value is located starting at the $8^{th}$ bit of the payload, and the size indicates that the value takes 2 bytes of the payload) along with the scale and offset. Translation service 202 may forward this message to CAN-USB HAL, which converts the CAN message to a USB signal before outputting the signal via the USB CAN interface via gateway 210 to CAN 211. CAN 211 may transmit the CAN message to one or more vehicle systems 26, which are represented in the example of FIG. 2A as electronic control units (ECU) 212A-212N ("ECUs 212")

The one of ECUs 212 responsible for controlling the HVAC system may reply to the message with the current temperature in degrees Fahrenheit, generating a CAN message that specifies the temperature in degrees Fahrenheit starting at bit eight in the payload as a two-byte temperature having a scale of two and an offset of 50 (e.g., a 90 degree temperature may be specified as 40). The HVAC ECU 212 may transmit the CAN message via CAN bus 211, whereupon gateway 210, USB CAN interface 208, and CAN-USB HAL 204 relay the CAN message to translation service 202.

Translation service 202 may translate the CAN message according to the foregoing mapping, replacing the message ID, bit, size, scale, and offset with HVAC_TEMPERATURE SET, READ, and ROW_1_LEFT. Translation service 202 may parse the temperature and invoke the FAHRENHEIT_TO_CELSIUS method, passing the temperature to the foregoing method. Prior to passing the temperature, translation service 202 may process the temperature according to the scale and offset (to recover the actual temperature of 90 degrees Fahrenheit). The FAHRENHEIT_TO_CELSIUS method may convert the temperature from degrees Fahrenheit to degrees Celsius, and specify the temperature in the standard control message. Translation service 202 may then transmit the standard control message to car service 200.

Although described with respect to a specific conversion process, i.e., FAHRENHEIT_TO_CELSIUS in the above example, the techniques may be performed with respect to other types of conversions. For example, other example conversion processes include a RADIUS_TO_CIRCUMFERENCE that calculates wheel travel distance on each full spin, a LOG or EXPONENT to convert reading from logarithmic potentiometer to a linear scale or vise versa.

A third example of EM 31 is shown below, which passes a temperature to the HVAC system of vehicle systems 26 as +1/−1 events.

```
vehicleProperty {
    vhalPropertyId: HVAC_TEMPERATURE_SET // standard ID
    access: WRITE
    canSignal {
        area: ROW_1_LEFT
        messageId: 0x123
        bit: 0
        size: 2
        offset: −1
        conversion {
            method: DELTA_UPDATE
            params {
                deltaUpdate {
                    initValue: 20 // 20 degree Celsius
                    maxStep: 1 // can't +/− more than 1
                                // degree
                }
            }
        }
    }
```

-continued

```
    canSignal {
        area: ROW_1_RIGHT
        ...
        bit: 2
        ...
    }
}
```

In the example directly above, EM 31 specifies a vhalPropertyId of "HVAC_TEMPERATURE_SET" along with an access of "WRITE" and an area of the front left drivers side ("ROW_1_LEFT"), which map to syntax of the standard control message. Next, EM 31 specifies the messageId of 0x123, bit of 0, size of 2, and offset of −1, which all represent CAN protocol syntax used in place of the vhalPropertyId, access and area. EM 31 then specifies a conversion that calls the method "DELTA_UPDATE" and lists parameters ("params") for the "deltaUpdate." Within the deltaUpdate of EM 31 is the initial value ("initValue") of 20 degrees Celsius, and a max step ("maxStep") size for the temperature.

Translation service 202 may receive or otherwise obtain a standard control message from car service 200 listing the HVAC_TEMPERATURE_SET, WRITE and ROW_1_LEFT, replacing these standard syntax elements with the 0x123, 0, 2, −1. Translation service 202 may insert at bit 0 of the payload, a two byte temperature update of −1 or 1, thereby translating the standard control message to a CAN message. Translation service 202 may output the CAN message to CAN-USB HAL 204, which converts the CAN message to USB signals before sending the USB signals via the USB CAN interface 208 and gateway 210.

CAN 211 may receive the CAN message and relay the CAN message to ECUs 26, where the appropriate one of ECUs 212 (i.e., the HVAC ECU in this example) may process the CAN message and output a response CAN message. The response CAN message may traverse CAN 211, gateway 210, USB CAN interface 208, and CAN-USB HAL 204 before arriving at translation service 202. Translation service 202 may perform the inverse translation or in other words mapping, based on the above example of EM 31, with respect to the response CAN message to obtain a response standard control message. Translation service 202 may output the response standard control message to car service 200.

In the example of FIG. 2B, head unit 24B is another example of head unit 24 shown in the example of FIG. 1. Head unit 24B may be similar, if not substantially similar, to head unit 24A except that in the example of FIG. 2B gateway 210 may perform the translation service previously described with respect to translation service 202. Translation service 202 of head unit 24B is replaced with a general VHAL service 220 that may perform other formatting, conversion or other processes with respect to the standard control message output by gateway 210 according to EM 31. Manufacturers may program gateway 210 to perform translation service 202 in order to provide additional security via firewalling CAN access.

Figure 3:
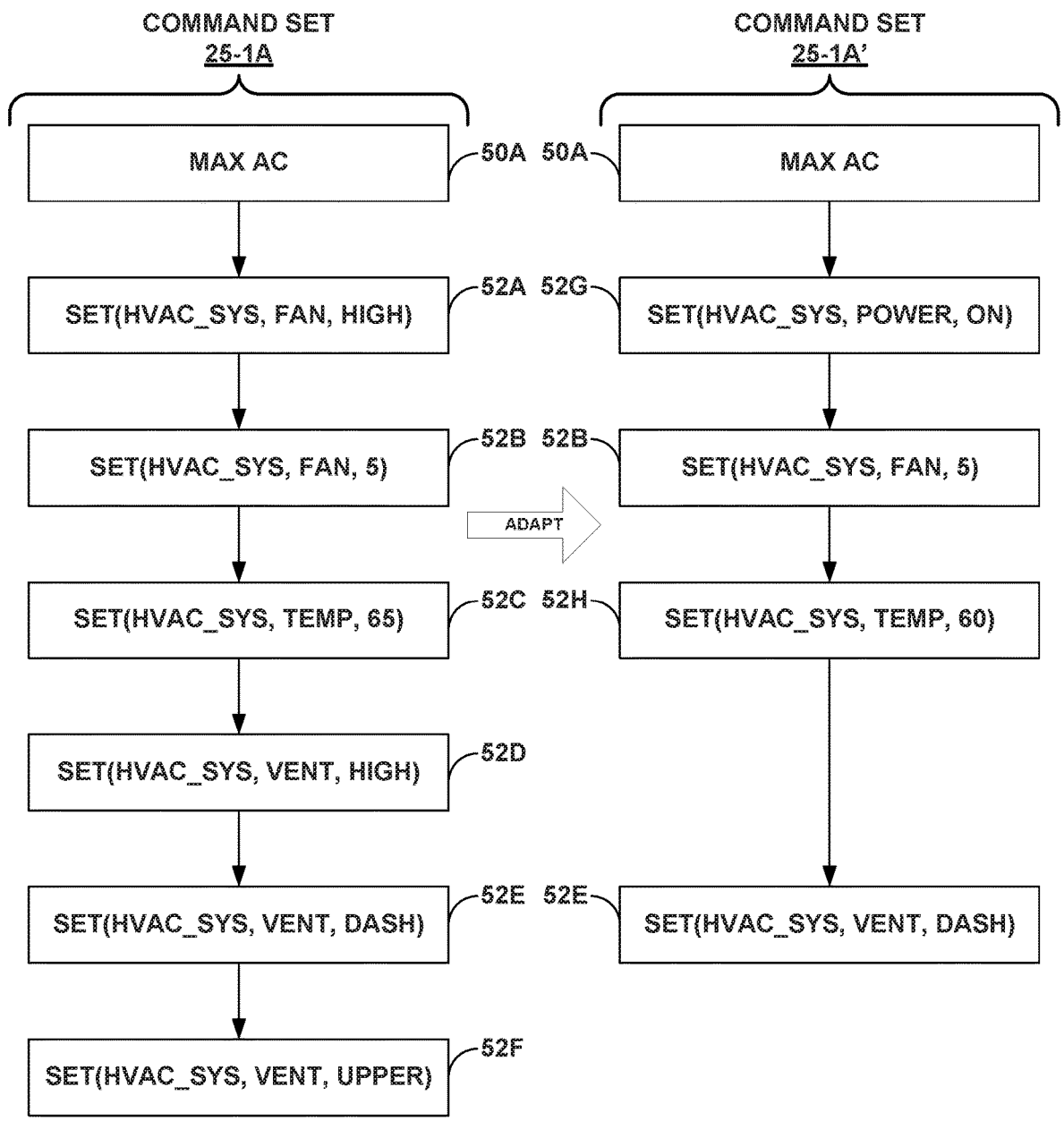
FIG. 3 is a diagram illustrating an example of the hardware abstraction layer (HAL) shown in FIG. 1 adapting a command set in accordance with various aspects of the techniques described in this disclosure.

FIG. 3 is a diagram illustrating an example of HAL 28 shown in FIG. 1 adapting command set 25-1A in accordance with various aspects of the techniques described in this disclosure. HAL 28 may initially specify command set 25-1A for an operational state change 50A that configures various parameters of HVAC system 26A to provide "MAX AC," which may refer to a maximum air condition configuration. Responsive to the occupant selecting or otherwise activating MAX AC 50A, HAL 28 may issue commands 52A-52F.

Command 52A specifies a SET command, which takes as variables a system identifier, a parameter, and a value. The system identifier in this example is assumed to be "HVAC_SYS," which represents an identifier associated with HVAC system 26A. All of commands 52A-52F specify the same system identifier, HVAC_SYS. The parameter of command 52A is assumed, for purposes of illustration, to be "FAN," which may refer to a fan speed of HVAC system 26A. The value of command 52A sets the fan speed to "HIGH."

Command 52B is another SET command that specifies the same system identifier and parameter as command 52A, but sets the fan speed to a value of "5." Redundant commands (referring to commands that may attempt to initiate a similar or same configuration for the same parameter exists within command set 25-1A because command set 25-1A is an initial generic command set capable of initiating MAX AC 50A for a number of different models of the same manufacturer, and/or a number of different models of different manufacturers.

Command 52C is another SET command that specifies the same system identifier as command 52A, but specifies a different parameter "TEMP," which refers to the cabin temperature that HVAC system 26A is to maintain. Command 52C sets the cabin temperature to a value of "65," (which is assumed for purposes of illustration to be in degrees Fahrenheit).

Command 52D is another SET command that specifies the same system identifier as command 52A, but specifies a different parameter "VENT," which refers to a vent or set of vents in the cabin of vehicle 10 from which cooled air is to be vented. Command 52D sets the vent to a value of "HIGH," which may refer to the dash vents in various ECUs.

Command 52E is another SET command that specifies the same system identifier and parameter as command 52D, but sets the vent to a value of "DASH," which refers to the dash vents. Command 52F is another SET command that specifies the same system identifier and parameter as command 52E, but sets the vent to a value of "UPPER," which refers to the dash vents and any ceiling vents. Again, redundant commands (referring to commands that may attempt to initiate a similar or same configuration for the same parameter exists within command set 25-1A because command set 25-1A is an initial generic command set capable of initiating MAX AC 50A for a number of different models of the same manufacturer, and/or a number of different models of different manufacturers.

HAL 28 may issue each of commands 52A-52F (either in sequence or concurrently) to vehicle system 26A, which may respond to each of commands 52A-52F with one or more messages specifying an operational state 27 of the above identified parameters. HAL 28 may adapt command set 25-1A based on operational states 27 to obtain adapted command set 25-1A'.

As shown in the example of FIG. 3, HAL 28 may adapt command set 25-1A to include new command 52G and remove commands 52D and 52F. HAL 28 may also adapt individual command 52C to obtain command 52H of adapted command set 25-1A'.

HAL 28 may obtain new command 52G as a result of receiving one of operational states 27 (e.g., in response to command 52A) indicating that HVAC system 26A is unable to complete command 52A because HVAC system 26A is not operational (referring to its active power state). HAL 28 may, responsive to the one of operational states 27, generate command 52G, which sets the parameter "POWER" of HVAC system 26A to a value of "ON." HAL 28 may iterate through one or more redundant commands that are similar to command 52G, but that specify the same parameter (but having a different identifier—such as "OPERATIONAL," or "AC"), and/or a different value (such as "YES" for "OPERATIONAL" parameter).

In this respect, command set 25-1A may initially be unable to initiate operational state change 50A of HVAC system 26A because HVAC system 26A was not activated (in terms of receiving power). HAL 28 may, as a result, automatically adapt command set 25-1A to enable command set 25-1A (in the form of adapted command set 25-1A') to initiate the operational state change of HVAC system 26A. In other words, HAL 28 may issue exploratory command sets to initiate an exploratory operational state change of the one or more systems, and responsive to issuing the command set and after the exploratory operational state change, obtain, from the one or more systems, respective indications of an actual operational state of each of one or more vehicle parameters. HAL 28 may next determine determine, for the exploratory command set, one or more dependencies between the actual operational states of the one or more vehicle parameters, and generate, based on the one or more dependencies, the extensible mapping to translate the command set from the local control message to the standard control message.

Continuing the example, HAL 28 may remove commands 52D and 52F as a result of receiving one or more of operational states 27 indicating that commands 52D and 52F were not recognized commands 52D and 52F (meaning, as one example, that commands 52D and 52F utilized syntax that was not supported by the ECU of HVAC system 26A). In some instances, systems 26 are from a first set of vendors and therefore may utilize different syntax for various parameters compared to systems from a second set of vendors (where it is assumed that the first set of vendors and the second set of vendors differ by at least one vendor). HAL 28 may initially issue redundant commands 52D-52F to determine which of commands 52D-52F result in a successful one of operational states 27.

Although described as issuing redundant commands 52D-52F, HAL 28 may reduce redundant commands 52D-52F by one or more commands based on various information retrievable by HAL 28 from HVAC system 26A. For example, HAL 28 may issue a GET comment to retrieve a type, vendor, etc. of HVAC system 26A. HAL 28 may associate different types, vendors, etc. of HVAC system 26A with different syntax. Based on this retrieved information, HAL 28 may eliminate or otherwise remove one or more of redundant commands 52D-52F associated with unsupported syntax.

Returning to the example shown in FIG. 3, HAL 28 may also adapt individual command 52C to change the value from 65 to 60. HAL 28 may have previously identified a lowest temperature value of 60 degrees Fahrenheit for HVAC system 26A, and automatically adapt command 52C to be set to the lowest temperature.

HAL 28 may then automatically generate EM 31 based on the adapted command set 25-1A'. HAL 28 may include general mappings for each command, which are placed into a script or other file that form EM 31, where each of the commands may be translated according to EM 31 from standard control messages to CAN messages.

Figure 4:
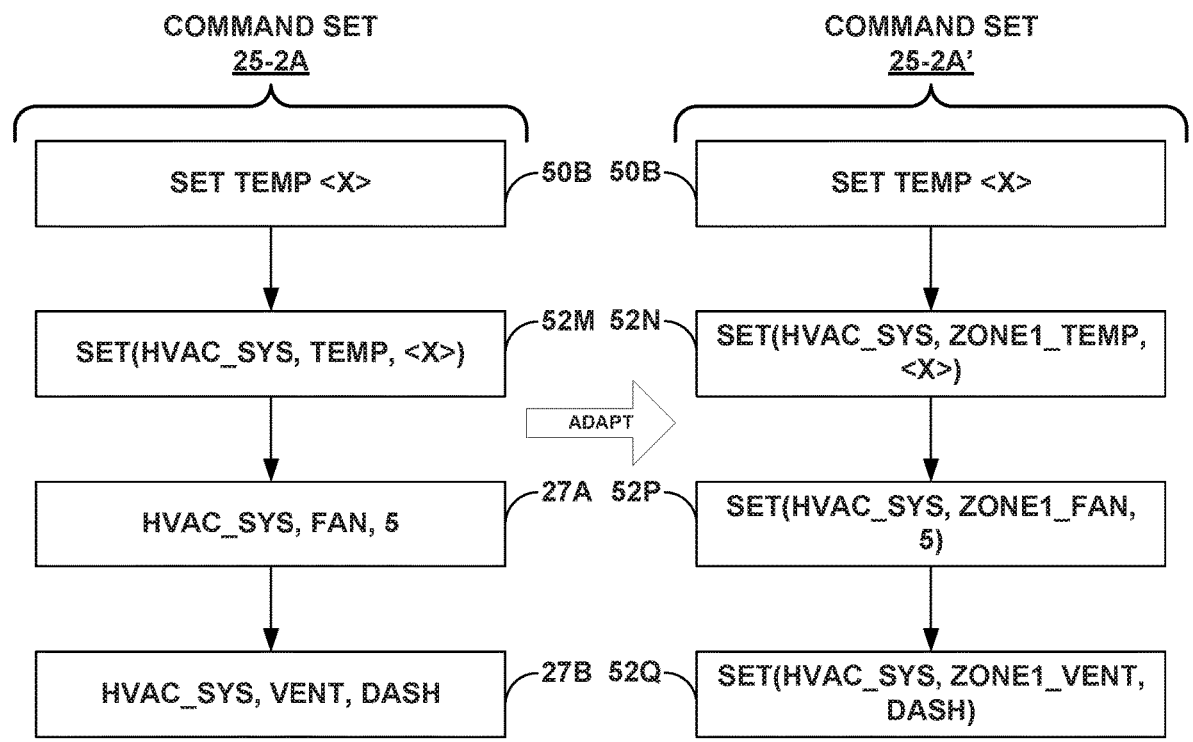
FIG. 4 is a diagram illustrating an example of the HAL shown in FIG. 1 adapting another command set in accordance with various aspects of the techniques described in this disclosure.

FIG. 4 is a diagram illustrating an example of HAL 28 shown in FIG. 1 adapting another command set 25-2A in accordance with various aspects of the techniques described in this disclosure. HAL 28 may initially specify command set 25-2A for an operational state change 50B that configures various parameters of HVAC system 26A to "SET TEMP <X>," which may refer to setting a temperature to a variable value of "X" entered by the occupant. Responsive to the occupant selecting or otherwise activating SET TEMP <X> 50B, HAL 28 may issue command 52M.

Command 52M specifies a SET command, which takes as variables a system identifier, a parameter, and a value. The system identifier in this example is assumed to be "HVAC_SYS," which represents an identifier associated with HVAC system 26A. The parameter of command 52M is assumed, for purposes of illustration, to be "TEMP," which may refer to temperature that HVAC system 26A is to maintain. The value of command 52M sets the temperature to a variable "X." The occupant may specify the value for variable "X."

Responsive to issuing command 52M to HVAC system 26A, HAL 28 may receive operational states 27A and 27B. Operational state 27A indicates that a value for a fan speed parameter, "FAN," is set to a speed of "5." Operational state 27B indicates that a vent parameter, "VENT," is set to "DASH."

After issuing command 52M, the occupant may indicate that the temperature is for a first HVAC zone within vehicle 10 and not a second HVAC zone within vehicle 10. As such, HAL 28 may adapt command set 25-2A to obtain command set 25-2A' such that command set 25-2A' includes commands 52N-52Q. Command 52N indicates that the temperature parameter is for the first HVAC zone within vehicle 10, changing "TEMP" parameter of command 52M to the "ZONE1_TEMP" parameter of command 52N. Commands 52P and 52Q also indicate that the FAN speed parameter and the VENT parameter are also for the first HVAC zone within vehicle 10, becoming "ZONE1_FAN" and "ZONE1_VENT." In this way, HAL 28 may adapt command sets 25-2A to better accommodate the occupant and reduce the amount of time the occupant focuses on head unit 24, which may improve safety during operation of vehicle 10.

HAL 28 may then automatically generate EM 31 based on the adapted command set 25-2A'. HAL 28 may include general mappings for each command, which are placed into a script or other file that form EM 31, where each of the commands may be translated according to EM 31 from standard control messages to CAN messages.

Figure 5:
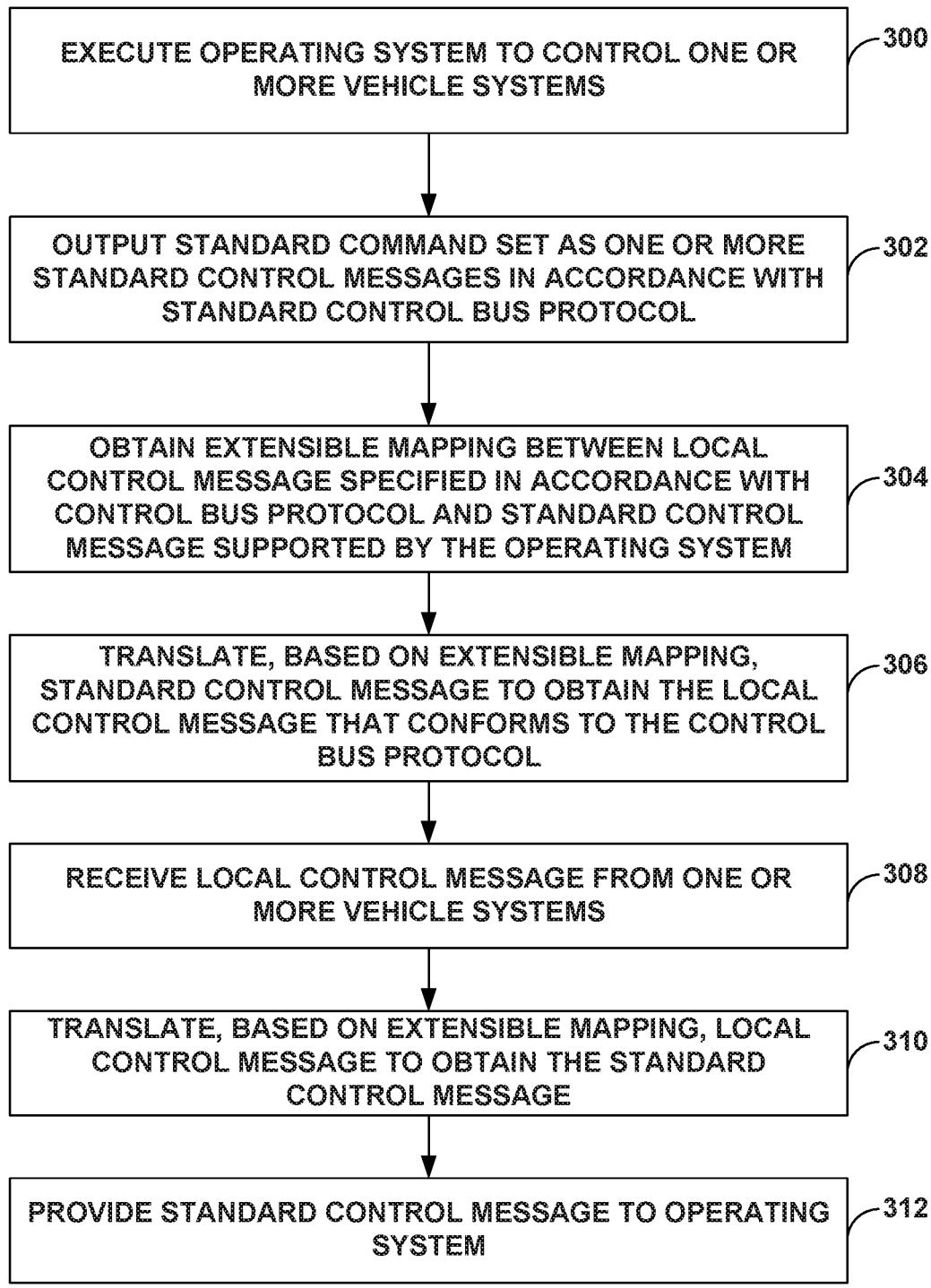
FIG. 5 is a flowchart illustrating example operation of the HAL of FIG. 1 in performing various aspects of the extensible mapping techniques described in this disclosure.

FIG. 5 is a flowchart illustrating example operation of HAL 28 of FIG. 1 in performing various aspects of the extensible mapping techniques described in this disclosure. As described above, processor 12 may execute OS 30 to control one or more of vehicle systems 26 (300), where OS 30 may support a standard command set. OS 30 may output the standard command set as one or more standard control messages in accordance with a common or standard control bus protocol (302). Processors 12 may obtain EM 31 from system memory 16, which may define a mapping between a local control message specified in accordance with a local control bus protocol and the standard control message supported by OS 30 (304). In some examples, processor 12 may execute HAL 28, which may configure processor 12 to obtain EM 31 when providing the software shim layer to enable OS 30 to interface with vehicle systems 26.

HAL 28 may receive the standard control message, which may include a first representation of a command set, such as one of command sets 25, to initiate an operational state change of one or more of vehicle systems 26. HAL 28 may apply EM 31 to the standard control message to rearrange or otherwise convert values of bytes within the standard control message, thereby translating the standard control message to obtain the local control message the conforms with the control bus protocol (306). The local control message may, as such, include a second representation of the command set. HAL 28 may transmit, via the control bus coupled to processor 12 and vehicle systems 26, the local control message to initiate the operational state chance of one or more of vehicle systems 26.

HAL 28 may likewise receive (or in some instances transparently intercept from the perspective of OS 30 and vehicle systems 26) local control messages that include operational states 27A-27N ("operational states 27," which are shown in FIG. 1 as "ST 27A-27N") from vehicle systems 26 (308). The local control messages may conform to the local control bus protocol. HAL 28 may translate, based on EM 31, the local control messages to obtain standard control messages, which again are supported by OS 30 (310). HAL 28, as noted above, may provide this translation as part of abstracting the underlying hardware (or in other words, as part of providing the shim software layer), allowing for potentially simpler development and installation of OS 30 across a variety of different hardware platforms. HAL 28 may provide the standard control messages to OS 30, which may obtain confirmation of operational state changes requested by previously sent standard control messages (312).

Figure 6:
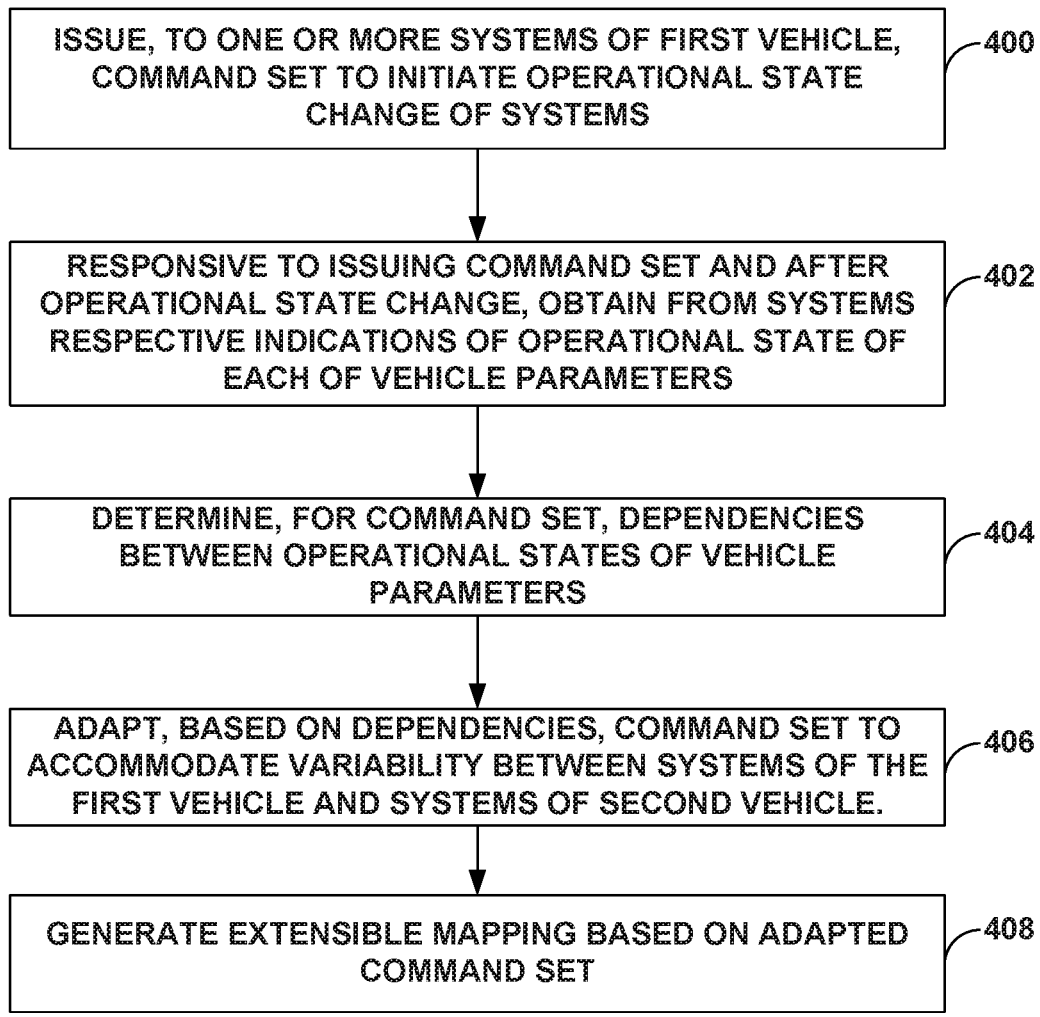
FIG. 6 is a flowchart illustrating example operation of the HAL of FIG. 1 in performing various aspects of the techniques described in this disclosure.

FIG. 6 is a flowchart illustrating example operation of HAL 28 of FIG. 1 in performing various aspects of the techniques described in this disclosure. As described above, HAL 28 may represent a unit configured to process outputs from OS 30 responsive, in one example, to input received via a GUI presented by display 20 from an occupant to change an operational state of one or more of vehicle systems 26. HAL 28 may also process outputs from OS 30 that are automatically generated in response to other inputs, such as operational states 27. The outputs may refer to command sets 25 issued by OS 30 to perform the operational state change. OS 30 may issue command sets 25 as a series of "SET" commands, each of which specify one of vehicle systems 26, a property of the one of vehicle systems 26, and a value for the specified property. The SET commands may specify the operational state to which the specified one of vehicle systems 26 is to maintain. In this respect, HAL 28 may issue, to one or more systems 26A of a first vehicle, e.g., vehicle 10, a command set 25A to initiate an operational state change of one or more of systems 26 (400).

HAL 28 may also process inputs from vehicle systems 26 indicative of current operational states 27 of various properties of vehicle systems 26. OS 30 may output "GET" commands that query vehicle systems 26 regarding the various properties to which vehicle systems 26 respond by providing the inputs indicative of current operational states 27. Similar to the "SET" commands, the "GET" commands may each specify one of vehicle systems 26 and a property of the one of vehicle systems 26 to which the query for a value is directed. In some examples, vehicle systems 26 may respond with inputs after performing various operational state changes responsive to "SET" commands. Regardless, HAL 28 may process the outputs and the inputs to determine associations 29.

To illustrate, assume that vehicle system 26A represents an HVAC system. Various HVAC systems may operate differently depending on an ignition state of the vehicle and underlying environmental control unit (ECU) of the HVAC system. Furthermore, consider that various properties of HVAC system 26A may interact with other properties of HVAC systems 26A and potentially other ones of vehicle systems 26B-26N. For example, when setting the HVAC temperature, HVAC system 26A may automatically change a speed of a fan. HAL 28 may determine associations 29 between various vehicle properties of HVAC system 26A represented by operation states 27A that result from outputting command sets 25A to vehicle systems 26 in order to set the HVAC temperature.

In this way, HAL 28 may, responsive to issue command set 25A and after the operational state change, obtain from systems 26 respective indications of operational state of each of the vehicle parameters (402). HAL 28 may next determine, for command set 25A, dependencies 29 between operational states of vehicle parameters (404).

HAL 28 may next adapt, based on associations 29, command set 25A to accommodate variability between systems 26 of the first vehicle and systems of a second vehicle (406). In the above example, HAL 28 may adapt, based on associations 29 identifying the dependency between setting the HVAC temperature and automatically changing the fan speed, command set 25A to include an additional command setting the fan speed of HVAC system 26A to its previously set fan speed value (which may be configured based on occupant preference or as a result of the occupant previously setting the fan speed of HVAC system 26A). HAL 28 may, in this way, adapt, based on the association 29 (which may also be referred to as "dependencies 29"), command sets 25 to accommodate variability between vehicle systems 26 of vehicle 10 and vehicle systems of a second vehicle. HAL 28 may also generate EM 31 (possibly automatically) based on the adapted command set (408).

In this respect, HAL 28 may process changes between operational states 27 to generate a record of the changes, parse operational states 27 to find causality between properties (which may also be referred to as "parameters"—e.g., when parameter A changes, parameters B and C also change), and generate associations 29 that identify the causalities (or, in other words, dependencies) between changes in operational state 27. In some example, HAL 28 may store associations 29 as a table, a linked list, a graph, a tree, or any other suitable data structure. In other examples, HAL 28 may train a model using machine learning to identify associations 29 and dynamically generate different versions of command sets 25 that address associations 29. As such, HAL 28 may, to determine dependencies 29, perform machine learning with respect to the operational state change initiated by command sets 25 and operational states 27 of the vehicle parameters.

In this way, the techniques may provide a Hardware Abstraction Layer (VHAL) 28 to allow OS 30 to interact with vehicle hardware, e.g., vehicle systems 26. HAL 28 may attempt to take different makes/models of vehicles and create an application programmer interface (API) surface that is common to all makes/models of vehicles. One problem is that there is a large variety of vehicles and vehicle behaviors may not be easily abstracted. For example, the HVAC system in cars behave differently based upon the ignition state of the vehicle and configuration of the HVAC ECU. It may not be possible to generate a common API that abstracts the behavior for each make/model of vehicle.

HAL 28 may currently be implemented as a list of vehicle properties that may be SET and GET. For instance, HAL 28 may SET the HVAC temperature and the vehicle 10 will respond accordingly. The complexity occurs when properties interact with each other to create side-effects. For instance, when setting the HVAC temperature, the fan speed may change automatically in response to the temperature change. This behavior may be vehicle dependent. The particular problem is that some properties may be disabled/enabled based upon the HVAC controller's settings, and OS 30 may need to understand these intricacies to accomplish a task.

For instance, if the AC system is disabled because the HVAC unit is off, OS 30 may need to turn on the HVAC unit before turning on the AC. So, when an occupant indicates to "turn on AC," OS 30 initiates the correct sequence of commands based on an operational state of vehicle systems 26.

In some instances, it is an impedance mismatch. OS 30 may expose a set of APIs (i.e. "turn on the AC to max") and the vehicles have a set of functionality that they support (i.e. "set fanspeed to 5" or "set temperature to 65"). These two APIs don't always align perfectly, and compromises are made. One solution to this problem is to have vehicle manufacturers write more of the "middleware" code to do what OS 30 needs the vehicles to support. This may be labor intensive and error prone, because each vehicle manufacturer needs to be trained to write the code. Another solution is to create the abstraction at a lower level of functionality that is common across all vehicles, but isn't ideal for all of the various vehicles. As such, OS 30 may restrict/limit some of the behaviors and code to the lowest common denominator.

The techniques of this disclosure may provide an algorithm by which to extract dependencies 29 between vehicle parameters. HAL 28 may determine a list of properties that can be set/get. When a property generates a side effect (e.g., setting a property changes other properties in the system), HAL 28 may detect and record this association 29, so, when the occupant initiates an operational change that is currently not allowed, HAL 28 may determine how to configure the properties via command sets 25 to initiate the operational change.

To determine the dependencies, HAL 28 may do the following:

1) Observe when properties change and keep a record of them;

2) Parse the data to find causality between parameters. e.g. when parameter A changes, parameters B and C also change with it.

3) Create a table of these causalities and refer to them when the system wants to take an action on a vehicle property.

HAL 28 may be implemented in many ways. In some instances, HAL 28 may collect machine learning (ML) training set as observed data over time. In other instances, HAL 28 may keep track of temporal correlations of properties and determine heuristics from the correlations. In either case, the concept is to have HAL 28 automatically adapt command sets 25 to each vehicle's idiosyncrasies without having to have a human manually input this into code. In this way, HAL 28 may reduce the complexity to bring a new vehicle implementation to market because HAL 28 may automatically adapt to changes in the vehicle and does not need to be hard coded.

Clause 1. A method of interfacing with a first vehicle, the method comprising: issuing, by a processor and to one or more systems of the first vehicle, a command set to initiate an operational state change of the one or more systems; responsive to issuing the command set and after the operational state change, obtaining, by the processor, from the one or more systems, respective indications of an operational state of each of one or more vehicle parameters; determining, by the processor and for the command set, one or more dependencies between the operational states of the one or more vehicle parameters; and adapting, by the processor and based on the one or more dependencies, the command set to accommodate variability between the one or more systems of the first vehicle and one or more systems of a second vehicle.

Clause 2. The method of clause 1, wherein the command set includes a first command set to specify a state for each of a first subset of the one or more vehicle parameters, and wherein adapting the command set comprises determining a second command set to specify a state for each of a second subset of the one or more vehicle parameters, the first subset of the one or more vehicle parameters different than the second subset of the one or more vehicle parameters.

Clause 3. The method of any combination of clauses 1 and 2, wherein adapting the command set comprises executing, by the processor, a hardware abstraction layer to adapt the command set.

Clause 4. The method of any combination of clauses 1-3, wherein determining the one or more dependencies comprises maintaining a table that associates the operational state change initiated by the command set and the operational state of the one or more vehicle parameters.

Clause 5. The method of any combination of clauses 1-4, wherein determining the one or more dependencies comprises performing machine learning with respect to the operation state change initiated by the command set and the states of the one or more vehicle parameters to identify the one or more dependencies.

Clause 6. The method of any combination of clauses 1-5, further comprising displaying, via a display device, a graphical user interface element representative of the command set.

Clause 7. The method of any combination of clauses 1-6, wherein the command set is initially unable to initiate the operational state change of the one or more systems, and wherein adapting the command set comprises adapting the command set to enable the command set to initiate the operational state change of the one or more systems.

Clause 8. The method of any combination of clauses 1-7, wherein the one or more systems of the first vehicle include a heating, ventilation, and air conditioning (HVAC) system of the first vehicle.

Clause 9. The method of any combination of clauses 1-8, wherein the one or more systems of the first vehicle are from a first set of vendors, and the one or more systems of the second vehicle are from a second set of vendors, the first set of vendors and the second set of vendors differing by at least one vendor.

Clause 10. A device configured to interface with a first vehicle, the head unit comprising: one or more memories configured to store a command set to initiate an operational state change of one or more systems of the first vehicle; and one or more processors configured to: issue, to the one or more systems of the first vehicle, the command set; obtain, from the one or more systems and responsive to issuing the command set and after the operational state change, respective indications of an operational state of each of one or more vehicle parameters; determine, for the command set, one or more dependencies between the operational states of the one or more vehicle parameters; and adapt, based on the one or more dependencies, the command set to accommodate variability between the one or more systems of the first vehicle and one or more systems of a second vehicle.

Clause 11. The device of clause 10, wherein the command set includes a first command set to specify a state for each of a first subset of the one or more vehicle parameters, and wherein the one or more processors are configured to determine a second command set to specify a state for each of a second subset of the one or more vehicle parameters, the first subset of the one or more vehicle parameters different than the second subset of the one or more vehicle parameters.

Clause 12. The device of any combination of clauses 10 and 11, wherein the one or more processors are configured to execute an operating system including a hardware abstraction layer, there hardware abstraction layer configured to adapt the command set.

Clause 13. The device of any combination of clauses 10-12, wherein the one or more processors are configured to maintain a table that associates the operational state change initiated by the command set and the operational state of the one or more vehicle parameters.

Clause 14. The device of any combination of clauses 10-13, wherein the one or more processors are configured to perform machine learning with respect to the operation state change initiated by the command set and the states of the one or more vehicle parameters to identify the one or more dependencies.

Clause 15. The device of any combination of clauses 10-14, further comprising a display device configured to display a graphical user interface element representative of the command set.

Clause 16. The device of any combination of clauses 10-15, wherein the command set is initially unable to initiate the operational state change of the one or more systems, and wherein the one or more processors are configured to adapt the command set to enable the command set to initiate the operational state change of the one or more systems.

Clause 17. The device of any combination of clauses 10-16, wherein the one or more systems of the first vehicle include a heating, ventilation, and air conditioning (HVAC) system of the first vehicle.

Clause 18. The device of any combination of clauses 10-17, wherein the one or more systems of the first vehicle are from a first set of vendors, and the one or more systems of the second vehicle are from a second set of vendors, the first set of vendors and the second set of vendors differing by at least one vendor.

Clause 19. The device of any combination of clauses 10-18, wherein the device comprises the first vehicle, wherein the first vehicle including a head unit, and wherein the head unit including the memory and the one or more processors.

Clause 20. A computer-readable medium having stored thereon instructions that, when executed, cause one or more processors to: issue, to one or more systems of the a vehicle, a command set to initiate an operational state change of the one or more systems; obtain, responsive to issuing the command set and after the operational state change, from the one or more systems, respective indications of an operational state of each of one or more vehicle parameters; determine, for the command set, one or more dependencies between the operational states of the one or more vehicle parameters; and adapt, based on the one or more dependencies, the command set to accommodate variability between the one or more systems of the first vehicle and one or more systems of a second vehicle.

Clause 21. A method comprising: executing, by one or more processors of a vehicle, an operating system to control one or more systems of the vehicle; obtaining, by the one or more processors, an extensible mapping between a local control message specified in accordance with a control bus protocol and a standard control message supported by the operating system; generate, by the operating system executed by the one or more processors, the standard control message, the standard control message including a first representation of a command set to initiate an operational state change of the one or more systems; translating, by the one or more processors and based on the extensible mapping, the standard control message to obtain the local control message, the local control message including a second representation of the command set; and transmitting, by the one or more processors and via a control bus coupled to the one or more processors and the one or more systems, the local control message to initiate the operational state change of the one or more systems.

Clause 22. The method of clause 21, wherein obtaining the extensible mapping comprises obtaining a file defining the extensible mapping between the local control message and the standard control message.

Clause 23. The method of any combination of clauses 21 and 22, wherein translating the standard control message comprises: executing a vehicle hardware abstraction layer to provide a shim between the control bus and the operating system; and translating, by the vehicle hardware abstraction layer and based on the extensible mapping, the standard control message to obtain the local control message.

Clause 24. The method of any combination of clauses 21-23, wherein translating the standard control message comprises: executing, by a dedicated control bus processor of the one or more processors, a control bus gateway to provide a shim between the control bus and the operating system; and translating, by the control bus gateway and based on the extensible mapping, the standard control message to the local control message.

Clause 25. The method of any combination of clauses 21-24, further comprising: receiving, via the control bus, a second local control message; translating, based on the extensible mapping, the second local control message to obtain a second standard control message; and updating, based on the second standard control message, one or more operational states of one or more vehicle parameters.

Clause 26. The method of any combination of clauses 21-25, further comprising obtaining an updated extensible mapping that defines a different mapping between the local control message and the standard control message.

Clause 27. The method of any combination of clauses 21-26, wherein the one or more systems of the vehicle include a heating, ventilation, and air conditioning system of the vehicle.

Clause 28. The method of any combination of clauses 21-27, wherein the control bus protocol comprises a controller area network (CAN) protocol.

Clause 29. The method of any combination of clauses 21-28, wherein the local control message includes a local control message formatted in accordance with one of a DBC format or a Kayak CAN definition (KCD) format.

Clause 30. The method of any combination of clauses 21-29, further comprising: issuing, to the one or more systems of the vehicle, an exploratory command set to initiate an exploratory operational state change of the one or more systems; responsive to issuing the command set and after the exploratory operational state change, obtaining, from the one or more systems, respective indications of an actual operational state of each of one or more vehicle parameters; determining, for the exploratory command set, one or more dependencies between the actual operational states of the one or more vehicle parameters; and generating, based on the one or more dependencies, the extensible mapping to translate the command set from the local control message to the standard control message.

Clause 31. A device configured to interact with a vehicle, the device comprising: a memory configured to store an extensible mapping between a local control message specified in accordance with a control bus protocol and a standard control message supported by an operating system; and one or more processors configured to: execute the operating system to control one or more systems of the vehicle, the operating system configured to generate the standard control message, the standard control message including a first representation of a command set to initiate an operational state change of the one or more systems; translate, based on the extensible mapping, the standard control message to obtain the local control message, the local control message including a second representation of the command set; and transmit, via a control bus coupled to the one or more processors and the one or more systems, the local control message to initiate the operational state change of the one or more systems.

Clause 32. The device of clause 31, wherein the one or more processors are configured to obtain a file defining the extensible mapping between the local control message and the standard control message.

Clause 33. The device of any combination of clauses 31 and 32, wherein the one or more processors are configured to: execute a vehicle hardware abstraction layer to provide a shim between the control bus and the operating system; and translate, by the vehicle hardware abstraction layer and based on the extensible mapping, the standard control message to obtain the local control message.

Clause 34. The device of any combination of clauses 31-33, wherein the one or more processors are configured to: execute, by a dedicated control bus processor of the one or more processors, a control bus gateway to provide a shim between the control bus and the operating system; and translate, by the control bus gateway and based on the extensible mapping, the standard control message to the local control message.

Clause 35. The device of any combination of clauses 31-34, wherein the one or more processors are further configured to: receive, via the control bus, a second local control message; translate, based on the extensible mapping, the second local control message to obtain a second standard control message; and update, based on the second standard control message, one or more operational states of one or more vehicle parameters.

Clause 36. The device of any combination of clauses 31-35, wherein the one or more processors are further configured to obtain an updated extensible mapping that defines a different mapping between the local control message and the standard control message.

Clause 37. The device of any combination of clauses 31-36, wherein the one or more systems of the vehicle include a heating, ventilation, and air conditioning system of the vehicle.

Clause 38. The device of any combination of clauses 31-37, wherein the control bus protocol comprises a controller area network (CAN) protocol.

Clause 39. The device of any combination of clauses 31-38, wherein the local control message includes a local control message formatted in accordance with one of a DBC format or a Kayak CAN definition (KCD) format.

Clause 40. A non-transitory computer-readable storage medium having stored thereon instructions that, when executed, cause one or more processors of a vehicle head unit to: execute an operating system to control one or more systems of the vehicle; obtain an extensible mapping between a local control message specified in accordance with a control bus protocol and a standard control message supported by the operating system, the operating system configured to generate the standard control message, the standard control message including a first representation of a command set to initiate an operational state change of the one or more systems; translate, based on the extensible mapping, the standard control message to obtain the local control message, the local control message including a second representation of the command set; and transmit, by the one or more processors and via a control bus coupled to the one or more processors and the one or more systems, the local control message to initiate the operational state change of the one or more systems.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
    executing, by one or more processors of a vehicle head unit integrated into a vehicle, an operating system to control one or more systems of the vehicle, provide entertainment for occupants of the vehicle, information regarding the vehicle, and provide an execution environment in which one or more applications execute;
    executing, by the one or more processors, a vehicle hardware abstraction layer to provide a software shim between a control bus, coupled to the one or more processors and the one or more systems, and the operating system;
    obtaining, by the one or more processors, an extensible mapping between a local control message specified in accordance with a control bus protocol and a standard control message supported by the operating system;
    generating, by the operating system executed by the one or more processors, the standard control message, the standard control message including a first representation of a command set to initiate an operational state change of the one or more systems;
    translating, by the vehicle hardware abstraction layer and based on the extensible mapping, the standard control message to obtain the local control message, the local control message including a second representation of the command set; and
    transmitting, by the one or more processors and via the control bus, the local control message to initiate the operational state change of the one or more systems.

2. The method of claim 1, wherein obtaining the extensible mapping comprises obtaining a file defining the extensible mapping between the local control message and the standard control message.

3. The method of claim 1, wherein translating the standard control message comprises:
    translating, by the vehicle hardware abstraction layer, without the operating system requesting the vehicle hardware abstraction layer to perform the translation, and based on the extensible mapping, the standard control message to obtain the local control message.

4. The method of claim 1, further comprising:
    receiving, via the control bus, a second local control message;
    translating, based on the extensible mapping, the second local control message to obtain a second standard control message; and
    updating, based on the second standard control message, one or more operational states of one or more vehicle parameters.

5. The method of claim 1, further comprising obtaining an updated extensible mapping that defines a different mapping between the local control message and the standard control message.

6. The method of claim 1, wherein the one or more systems of the vehicle include a heating, ventilation, and air conditioning system of the vehicle.

7. The method of claim 1, wherein the control bus protocol comprises a controller area network (CAN) protocol.

8. The method of claim 1, wherein the local control message includes a local control message formatted in accordance with one of a DBC format or a Kayak CAN definition (KCD) format.

9. The method of claim 1, further comprising:
issuing, to the one or more systems of the vehicle, an exploratory command set to initiate an exploratory operational state change of the one or more systems;
responsive to issuing the command set and after the exploratory operational state change, obtaining, from the one or more systems, respective indications of an actual operational state of each of one or more vehicle parameters;
determining, for the exploratory command set, one or more dependencies between the actual operational states of the one or more vehicle parameters; and
generating, based on the one or more dependencies, the extensible mapping to translate the command set from the local control message to the standard control message.

10. A device configured to interact with a vehicle, the device including a vehicle head unit integrated into the vehicle, the vehicle head unit comprising:
a memory configured to store an extensible mapping between a local control message specified in accordance with a control bus protocol and a standard control message supported by an operating system; and
one or more processors configured to:
execute the operating system to control one or more systems of the vehicle, provide entertainment for occupants of the vehicle, and information regarding the vehicle, the operating system configured to generate the standard control message and provide an execution environment in which one or more applications execute, the standard control message including a first representation of a command set to initiate an operational state change of the one or more systems;
execute a vehicle hardware abstraction layer to:
provide a software shim between a control bus, coupled to the one or more processors and the one or more systems, and the operating system; and
translate, based on the extensible mapping, the standard control message to obtain the local control message, the local control message including a second representation of the command set; and
transmit, via the control bus, the local control message to initiate the operational state change of the one or more systems.

11. The device of claim 10, wherein the one or more processors are configured to obtain a file defining the extensible mapping between the local control message and the standard control message.

12. The device of claim 10, wherein the one or more processors are configured to:
translate, by the vehicle hardware abstraction layer, without the operating system requesting the translation, and based on the extensible mapping, the standard control message to obtain the local control message.

13. The device of claim 10, wherein the one or more processors are further configured to:
receive, via the control bus, a second local control message;
translate, based on the extensible mapping, the second local control message to obtain a second standard control message; and
update, based on the second standard control message, one or more operational states of one or more vehicle parameters.

14. The device of claim 10, wherein the one or more processors are further configured to obtain an updated extensible mapping that defines a different mapping between the local control message and the standard control message.

15. The device of claim 10, wherein the one or more systems of the vehicle include a heating, ventilation, and air conditioning system of the vehicle.

16. The device of claim 10, wherein the control bus protocol comprises a controller area network (CAN) protocol.

17. The device of claim 10, wherein the local control message includes a local control message formatted in accordance with one of a DBC format or a Kayak CAN definition (KCD) format.

18. A non-transitory computer-readable storage medium having stored thereon instructions that, when executed, cause one or more processors of a vehicle head unit to:
execute an operating system to control the vehicle head unit and one or more systems of the vehicle, provide entertainment for occupants of the vehicle, information regarding the vehicle, and provide an execution environment in which one or more applications execute;
obtain an extensible mapping between a local control message specified in accordance with a control bus protocol and a standard control message supported by the operating system, the operating system configured to generate the standard control message, the standard control message including a first representation of a command set to initiate an operational state change of the one or more systems;
execute a vehicle hardware abstraction layer to:
provide a software shim between a control bus, coupled to the one or more processors and the one or more systems, and the operating system; and
translate, based on the extensible mapping, the standard control message to obtain the local control message, the local control message including a second representation of the command set; and
transmit, by the one or more processors and via the control bus, the local control message to initiate the operational state change of the one or more systems.

* * * * *